United States Patent
Rosario et al.

(10) Patent No.: US 9,495,594 B2
(45) Date of Patent: Nov. 15, 2016

(54) IMAGE ANOMALY DETECTION IN A TARGET AREA USING POLARIMETRIC SENSOR DATA

(71) Applicant: U.S. Army Research Laboratory, Adelphi, MD (US)

(72) Inventors: Dalton S. Rosario, Germantown, MD (US);
(Continued)

(73) Assignee: The United States of America as represented by the Secretary of the Army, Washington, DC (US)

( * ) Notice: Subject to any disclaimer, the term of this patent is extended or adjusted under 35 U.S.C. 154(b) by 341 days.

(21) Appl. No.: 14/296,653

(22) Filed: Jun. 5, 2014

(65) Prior Publication Data
US 2015/0023553 A1    Jan. 22, 2015

Related U.S. Application Data

(60) Provisional application No. 61/847,952, filed on Jul. 18, 2013.

(51) Int. Cl.
    *G06K 9/00*      (2006.01)
    *G06K 9/20*      (2006.01)
    *G06K 9/62*      (2006.01)

(52) U.S. Cl.
    CPC ........... *G06K 9/00624* (2013.01); *G06K 9/209* (2013.01); *G06K 9/6289* (2013.01)

(58) Field of Classification Search
None
See application file for complete search history.

(56) References Cited

U.S. PATENT DOCUMENTS

| | | |
|---|---|---|
| 4,333,008 A | 6/1982 | Misek |
| 5,878,163 A | 3/1999 | Stephan et al. |

(Continued)

OTHER PUBLICATIONS

M. W. Hyde, IV, S. C. Cain, J. D. Schmidt, and M. J. Havrilla, "Material classification of an unknown object using turbulence-degraded polarimetric imagery," IEEE Trans. Geoscience and Remote Sensing. Remote Sens., vol. 49, No. 1, pp. 264-276, Jan. 2011.

(Continued)

*Primary Examiner* — Weiwen Yang
(74) *Attorney, Agent, or Firm* — Alan I. Kalb; Eric Brett Compton

(57) ABSTRACT

A methodology for detecting image anomalies in a target area for classifying objects therein, in which at least two images of the target area are obtained from a sensor representing different polarization components. The methodology can be used to classify and/or discriminate manmade objects from natural objects in a target area, for example. A data cube is constructed from the at least two images with the at least two images being aligned, such as on a pixel-wise basis. A processor computes the global covariance of the data cube and thereafter locates a test window over a portion of the data cube. The local covariance of the contents of the test window is computed and objects are classified within the test window when an image anomaly is detected in the test window. For example, an image anomaly may be determined when a matrix determinant ratio of the local covariance and the global covariance exceeds a probability ratio threshold. The window can then be moved, e.g., by one or more pixels to form a new test window in the target area, and the above steps repeated until all of the pixels in the data cube have been included in at least one test window.

19 Claims, 2 Drawing Sheets

(72) Inventors: Joao M. Romano, Belleville, NJ (US);
James P. McCarthy, Nailsworth (AU)

(56) References Cited

U.S. PATENT DOCUMENTS

| | | | |
|---|---|---|---|
| 7,289,211 | B1 | 10/2007 | Walsh, Jr. et al. |
| 7,420,675 | B2 | 9/2008 | Giakos |
| 2006/0169904 | A1 | 8/2006 | Grobmyer et al. |
| 2011/0257527 | A1* | 10/2011 | Suri .................... A61B 8/0858 600/440 |
| 2012/0170116 | A1 | 7/2012 | Gurton |

OTHER PUBLICATIONS

J. Peng and C. S. Ruf, "Covariance statistics of polarimetric brightness temperature measurements," IEEE Trans. Geosci. Remote Sens., vol. 46, No. 10, pp. 3238-3251, Oct. 2008.
S. Tominaga and A. Kimachi, "Polarization imaging for material classification," Opt. Eng., vol. 47, No. 12, p. 123 201, Dec. 2008.
F. A. Sadjadi and C. S. L. Chun, "Polarimetric IR target classification," IEEE Trans. Aerosp. Electron. Syst., vol. 37, No. 2, pp. 740-751, Apr. 2001.
V. Thilak, D. G. Voelz, and C. D. Creusere, "Image segmentation from multi-look passive polarimetric imagery," in Proc. SPIE, J. A. Shaw and J. S. Tyo, Eds., 2007, vol. 6682, No. 1, pp. 668-206.
V. Thilak, D. G. Voelz, and C. D. Creusere, "Polarization-based index of refraction and reflection angle estimation for remote sensing applications," Appl. Opt. , vol. 46, No. 30, pp. 7527-7536, Oct. 2007.
L. B. Wolff, "Polarization-based material classification from specular reflection," IEEE Trans. Pattern Anal. Mach. Intell., vol. 12, No. 11, pp. 1059-1071, Nov. 1990.
J. S. Tyo, D. L. Goldstein, D. B. Chenault, and J. A. Shaw, "Review of passive imaging polarimetric for remote sensing applications," Appl. Opt., vol. 45, No. 22, pp. 5453-5469, Aug. 2006.
L. Wolff and T. Boult, "Constraining object features using a polarization reflectance model," IEEE Trans. Pattern Anal. Mach. Intell., vol. 13, No. 7, pp. 635-657, Jul. 1991.
L. Wolff, "Using polarimetric to separate reflection components," in Proc. IEEE Conf. CVPR, San Diego, CA, Jun. 1989, pp. 363-369.
Y. Zhao, Q. Pan, and H. Zhang, "Material classification based on multiband polarimetric images fusion," in Proc. SPIE, D. H. Goldstein and D. B. Chenault, Eds., 2006, vol. 6240, No. 1, p. 624 007.
C. Chen, Y. Zhao, L. Luo, D. Liu, and Q. Pan, "Robust materials classification based on multispectral polarimetric BRDF imagery," in Proc. SPIE, K. Zhang, X. Wang, G. Zhang, and K. Ai, Eds., 2009, vol. 7384, No. 1, p. 738 40T.
F.-M. Breon, D. Tanre, P. Lecomte, and M. Herman, "Polarized reflectance of bare soils and vegetation: Measurements and models," IEEE Trans. Geosci. Remote Sens., vol. 33, No. 2, pp. 487-499, Mar. 1995.
J. M. Cathcart and R. D. Bock, "Analysis of infrared polarization signatures for backgrounds and objects," in Proc. IEEE Int. Geosci. Remote Symp., Dec. 2004, vol. 3, pp. 1593-1596.
D. A. Lavigne, M. Breton, M. Pichette, V. Larochelle, and J.-R. Simard, "Enhanced military target discrimination using active and passive polarimetric imagery," in Proc. IEEE IGARSS, 2008, vol. 5, pp. V-354-V-357.
J. L. Michalson, J. M. Romano, and L. Roth, "Stokes vector analysis of LWIR polarimetric in adverse weather," in Proc SPIE, 2011, vol. 8160, p. 81 600N.
J. S. Tyo, B. M. Ratliff, J. K. Boger, W. T. Black, D. L. Bowers, and M. P. Fetrow, "The effects of thermal equilibrium and contrast in LWIR polarimetric images," Opt. Exp., vol. 15, No. 23, pp. 15 161-15 167, Nov. 2007.
F. A. Sadjadi and C. S. L. Chun, "Remote sensing using passive infrared stokes parameters," Opt. Eng., vol. 43, No. 10, pp. 2283-2291, Oct. 2004.
I. K. Sendur, "Analysis of polarimetric IR phenomena for detection of surface mines," in Proc. SPIE DSS, Mar. 2001, vol. 4394, pp. 153-163.
S. Matteoli, M. Diani, and G. Corsini, "A tutorial overview of anomaly detection in hyperspectral images," IEEE Aerosp. Electron. Syst. Mag., vol. 25, No. 7, pp. 5-28, Jul. 2010.
F. Goudail, P. Terrier, Y. Takakura, L. Bigué, F. Galland, and V. DeVlaminck, "Target detection with a liquid crystal-based passive stokes polarimeter," Appl. Opt., vol. 43, No. 2, pp. 274-282, Jan. 2004.
Romano, J.; Rosario, D.; Nasrabadi, N., "Covariance Trace for Polarimetric Anomaly Detection," Proc. of IEEE IGARSS, Munich, Germany, Jul. 22, 2012.
Romano, J.; Rosario, D.; McCarthy, J., "Day/Night Polarimetric Anomaly Detection Using SPICE Imagery," IEEE TGRS, vol. 50(12), pp. 5014-5023, Dec. 2012.

* cited by examiner

IMAGE ANOMALY DETECTION IN A TARGET AREA USING POLARIMETRIC SENSOR DATA

CROSS-REFERENCE TO RELATED APPLICATIONS

This application claims priority of U.S. Provisional Application No. 61/847,592 filed Jul. 18, 2013, the contents of which are incorporated herein by reference in its entirety.

GOVERNMENT INTEREST

The invention described herein may be manufactured, used, and licensed by or for the United States Government without the payment of royalties thereon.

BACKGROUND OF THE INVENTION

I. Field of the Invention

The present invention relates generally to image anomaly detection in a target area and, more particularly, to a methodology for analyzing polarimetric sensor data of the target area to detect image anomalies. The methodology can be used for classifying and/or discriminating between object classes in the target area, such as: manmade objects and natural objects, for example.

II. Description of Related Art

Detection of anomalies, using data produced by remote sensing technologies, represents a critical technology for many applications, including intelligence, surveillance, and reconnaissance. Some conventional methods have utilized linearly polarized infrared or thermal radiances of the target area.

Most, if not all, of conventional infrared anomaly detection systems are based on the premise that manmade objects, such as tanks, trucks, and any other equipment, tend to retain thermal energy (hence, to increase their temperatures) from continuous and direct exposure to the environment, and/or a major source of thermal energy (e.g., the sun), more rapidly than natural objects do, such as grass, ground, trees, foliage, and the like. The result from this rapid heat retention by manmade objects is that these objects also dissipate thermal energy more rapidly than natural objects do.

Over a daily period, manmade objects within the target area typically absorb, and thus emit, infrared (thermal) energy more rapidly than natural objects do, beginning at sunrise and continuing throughout the day until a few hours after sunset. This trend difference between the two object classes continues throughout the night until the next sunrise, when the diurnal cycle is repeated. Consequently, the emission of infrared energy (or radiation) by manmade objects in the target area, and potential thermal feature separation of these manmade objects from natural objects, is highly dependent upon the time of day. In addition, manmade surfaces are also known for emitting polarized infrared radiance—independently of their emission rate, as these surfaces tend to be smooth relative to the length of infrared electromagnetic waves in corresponding regions of the spectrum. This is in contrast to surfaces of natural objects, where their emitted radiance generally yields no favoritism to any particular polarization, as these natural surfaces are rough (not smooth) relative to the same infrared electromagnetic wavelengths.

Existing infrared polarimetric anomaly detection systems may utilize polarimetric imagery from passive sensors in which four infrared polarization filtered pixel images of the target area are obtained by these sensors. These systems output and process imagery in the form, known in the remote sensing community, as the Stokes polarization parameters $(S_0, S_1, S_2)$, or Stokes vector, using the four infrared polarization filtered pixel images $(I_{0°}, I_{45°}, I_{90°}, I_{135°})$ as input, where the subscripts of I label the corresponding polarization component angles; these relationships are expressed as $$\begin{bmatrix} S_0 \\ S_1 \\ S_2 \end{bmatrix} = \begin{bmatrix} (I_{0°} + I_{45°} + I_{90°} + I_{135°})/2 \\ I_{0°} - I_{90°} \\ I_{45°} - I_{135°} \end{bmatrix},$$

where another popular metric, known in the same community as the degree of linear polarization (DOLP), is readily determined:

$$DOLP = \frac{\sqrt{S_1^2 + S_2^2}}{S_0}.$$

Of the three Stokes parameters, $S_1$ is usually considered the most effective in detecting manmade objects in the target area, which is believed to be overwhelmingly composed by natural objects. However, when the probability distribution function of the Stokes $S_1$ parameter is plotted, the $S_1$ parameter for manmade objects often heavily overlaps the probability distribution function for natural objects, such that separation in the $S_1$ domain of manmade objects from natural objects in the target area is difficult, if not impossible, to achieve. The overlapping of the probability distribution functions of the Stokes $S_1$ parameter for manmade objects and natural objects also varies as a function of the time of day. Thus, anomaly detection at certain time periods, e.g. early morning, not only is very difficult, but it is also highly prone to error (e.g., false positives).

Still other methods have been attempted to detect and separate manmade objects in a target area from natural objects also in the target area. These other methods have included analysis of the DOLP metric, the Fresnel ratio, as well as multispectral polarimetric measurements. None of these methods, however, have significantly improved the detection of manmade objects in the target area as compared with the analysis of the Stokes $S_1$ parameter, using data produced by either a passive or active sensor from a short range between sensor and objects in a controlled laboratory environment. Moreover, the use of Stokes $S_1$ parameter has also been shown to be significantly less effective when data are collected in an uncontrolled outdoor environment, especially when a passive sensor is used for data acquisition at a range greater than 200 m. In practice, commercial and military remote sensing surveillance applications require ranges to be greater than 300 m, and users executing surveillance operations favor the application of passive rather than active sensors for reasons to be explained later. Local surface orientation, constructive and destructive measurement interferences are often cited as sources of performance degradation using passive Stokes $S_1$ measurements from an uncontrolled outdoor environment.

SUMMARY OF THE PRESENT INVENTION

Using remote sensing polarimetric data, embodiments of the present invention present a methodology for detecting image anomalies in a target area for classifying objects therein between classes. The methodology can be used to discriminate object classes in the target area, such as manmade objects from natural objects in a target area, for example.

According to exemplary method of the present invention, at least two images of the target area are first obtained from a sensor, such as a passive polarimetric LWIR sensor. These two images are obtained at different polarization angles, such as at 0 degrees and 90 degrees. Such images may be obtained of the target area by rotating a polarization filter associated with the sensor by the desired angular shift of the polarization components, for instance. While multiple polarization filtered pixel images of the target area with each image at a different polarization angle may be used, in practice, only two images at polarizations offset from each other by 90 degrees, i.e. $\theta=0$ and $\theta=90$, have proven sufficient to correctly discriminate manmade objects from natural objects in accordance with embodiments of the present invention.

The images are received by a computer for processing. A data cube is constructed in memory by the computer processor using the at least two polarization filtered images so that the infrared images are aligned, such as on a pixel-wise basis.

After creation of the data cube, the computer processor is then used to compute a global covariance of the composite image from the entire data cube. Any conventional algorithm that estimates covariance matrices may be used to compute the global covariance of the data cube. Thereafter, a test window that is much smaller in size than the images of the target area, e.g. 10 pixels by 10 pixels, is then located over a portion of the data cube. To begin, the test window may be first located at one corner of the data cube, for instance. The processor is then used to compute a local covariance of the content of that test window, using the same covariance matrix estimation algorithm used to compute the global covariance.

Objects in the content of the test window are declared "anomalies" when a ratio of the determinant of the local covariance over the determinant of the global covariance exceeds a probability-ratio threshold. And, as an example, a Bayes decision rule can be used to form the probability-ratio test. The window is then moved within the target area by one or more pixels to form a new, but possibly overlapping, test window; where the probability-ratio test is repeated for the new test window. The entire process is repeated until all pixels in the data cube have been included in at least one test window.

BRIEF DESCRIPTION OF THE DRAWING

The present invention can be better understood by referring to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
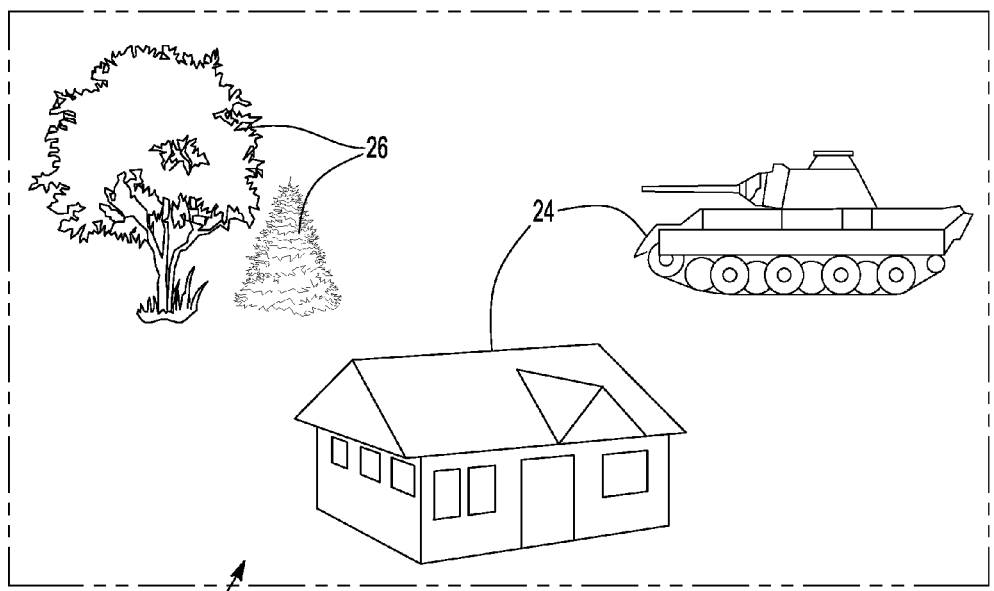
FIG. 1 is a diagrammatic view illustrating a target area and a block diagram of hardware system used in the implementation of an exemplary embodiment of the present invention.

With reference first to FIG. 1, a sensor 20 is shown and oriented to collect data from an exemplary target area 22. The sensor 20 data then may be used to detect certain anomalies in the target area. This target area 22, for example, may contain manmade objects 24, such as military tanks, other equipments, or buildings (installations), as well as natural objects 26, such as trees and the natural flora within the test area 22. Trees and flora often confuse surveillance systems that are designed to autonomously detect the presence of manmade objects (targets) in a natural environment, and sometimes these natural objects can partially obscure these targets making them difficult to be detected even by the naked-eye, or by some other means. Human clothes can potentially be detected since they are manmade objects. Configuring sensors to operate in certain regions of the electromagnetic spectrum, data from said sensors can potentially be exploited using tailored methods to detect manmade objects 24 as anomalies in a target area 22 dominated by the presence of natural objects 26. The methodology of this invention can enable the standalone computer 32 to discriminate manmade objects from natural objects in a target area; and depending on the sensor's operating wavelengths, this discriminant capability may apply to both daytime and nighttime.

The sensor 20 may be configured to detect radiance, for example, in various bands or sub-bands of the infrared, visible or ultraviolet regions of the electromagnetic spectrum. The infrared region of the spectrum is of particular interest for surveillance applications because it covers beyond the region of the spectrum that is visible by the human naked eye, while potentially offering discriminant features between manmade and natural objects. This region includes sub-bands of near infrared (0.75-1.4 µm), short-wave infrared (1.4-3 µm), midwave infrared (3-8 µm), LWIR (8-15), and far infrared (20-1,000 µm). In the preferred embodiment of the present invention, the sensor 20 is configured to detect LWIR radiation, since LWIR is a region of the spectrum in which useful data can be produced by a passive sensor during daytime and nighttime; a highly desired capability for both commercial and military surveillance applications.

While both active and passive sensors could be used, as mentioned earlier, the preferred embodiment of this invention is to make sensor 20 a passive sensor because this type of sensor does not require the transmission of artificial signals, as it is required for active sensors, or the application of additional illumination (such as a laser aimed at the direction of specific objects in the target area), both of which could potentially give away the illumination source (sensor's or laser's position, depending on the system operational arrangement). It is also worth noting that if a typical narrowband laser beam is employed to provide the additional illumination, the operation would require a human subject or machine to accurately aim the laser beam at potential target objects in the scene of interest, defeating the purpose of the deployment of a surveillance system to a scenario where no information about the scene is known a priori—this is usually the case for most of the commercial and military surveillance applications. Passive sensors, in contrast, are designed to passively detect reflected or emitted radiances from all objects in the target area, which makes a passive sensor more suitable than an active sensor for wide area surveillance applications, while potentially never giving away the sensor's location to enemies or foes who may be searching for a known wavelength, energy, pulse width, etc., from transmitted signals associated with active devices.

The sensor 20 outputs data in the form of an image composed of pixels, for instance. It could be a still camera or video camera in many embodiments.

The polarization of detected radiance by the sensor 20 can play an important role in detecting the presence of manmade objects in the target area 22 as image anomalies, under the assumption that the target area 22 primarily consists of image data of a natural environment.

By convention, the polarization of electromagnetic waves refers to the polarization of the electric field. Electromagnetic waves, which can be approximated as a plane wave in free space or in an isotropic medium propagates as a transverse wave, i.e., both the electric and magnetic fields are perpendicular to the wave's direction of travel. The oscillation of these fields may be in a single direction (i.e., linear polarization), or the field may rotate at the optical frequency (i.e., circular or elliptical polarization). When polarization is exhibited, the direction of the fields' rotation does determine the specified polarization, and by using a clockwise or counterclockwise convention the fields' rotation can be specified by the resulting angle (e.g., 0 degree, 45 degree). Linear, circular, and elliptical polarization associated with a particular angle is referred to as polarization component.

In some embodiments, a polarization filter 28 is employed immediately in front of the optical lens of the sensor 20, so that the sensor 20 can only output image data that correspond to specific radiance polarization components allowed by the mechanical rotation of filter 28 relative to the sensor's optical lens. The filter 28 may be rotatable, such as positioned on a mechanism that will mechanically rotate (e.g., clockwise and/or counterclockwise), so that the polarizer filter 28 can obtain different polarization components from the target scene. The main-axis angle of the filter 28 with respect to a non-rotating main-axis optical lens of sensor 20 determines the polarization angle detected by the sensor 20. Thus, with the filter 28 oriented at an angle of θ=0 degrees, the sensor 20 outputs image pixel data of the intensity of the infrared image of the test area 22 for a polarization of 0 degrees. Conversely, rotation of the filter 28 by 90 degrees will result in the sensor 20 outputting pixel intensity data to a programmed computer 32 and so forth. It will be understood, of course, that the filter angles of 0 and 90 degrees are by way of example only, and that other angles of polarization of the filter 28 may be used provided, however, that at least two different polarization angles are used to obtain at least two polarization filtered pixel images of the target area 22.

In other embodiments, the sensor 20 may be configured to output image data using a predetermined format that linearly combines subsets of individual polarization components of the detected radiance. Most of the commercially available polarimetric sensors are designed to directly output data in this predetermined format known in the scientific community as the Stokes parameters $S_0$, $S_1$, and $S_2$. The Stokes parameters are defined as follows:

$$\begin{bmatrix} S_0 \\ S_1 \\ S_2 \end{bmatrix} = \begin{bmatrix} (I_{0°} + I_{45°} + I_{90°} + I_{135°})/2 \\ I_{0°} - I_{90°} \\ I_{45°} - I_{135°} \end{bmatrix},$$

where I denotes the intensity at each pixel location and for the different polarization angles illustrated, in this case 0 degrees, 45 degrees, 90 degrees, and 135 degrees. Thus, from this data format, the intensity I for each pixel at each polarization angle θ may be computed by the computer 32 from the Stokes parameters according to an existing formula:

$$I_θ = 0.5(S_0 + S_1 \cos 2θ + S_2 \sin 2θ).$$

Using the formula immediately above, the Stokes parameter configured output of sensor 20 can be converted to images representing individual polarization components of radiance, and in accordance with embodiments of the present invention, at least two images are required to represent different polarization angles, which are then used for further processing.

Figure 2:
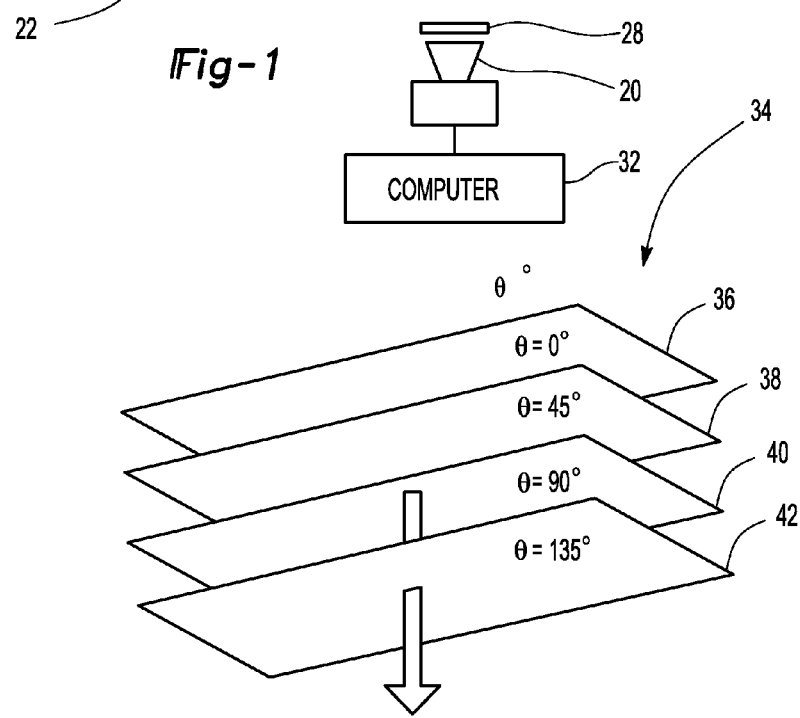
FIG. 2 is a diagrammatic view illustrating one embodiment for the construction of the data cube.

With reference to FIG. 2, after at least two pixel images representing different polarization components (90 degrees apart) have been obtained of the target area 22, either by a direct means through sensor 20 or by a mathematical conversion internally processed in the sensor 20 for computing the intensity from the Stokes parameters according to the above equation, the pixel images are then fed as data to the computer 32, which is programmed to create a data cube 34. It is noted that if the sensor 20 is configured to output Stokes parameters' images, but it is not configured to internally compute the intensity conversions, then these may be computed by the computer 32, before the data cube 34 can be created. The computer 32 includes one or more processors as known in the art. Modules having processor-executable instructions can be stored in a non-transient memory device associated with the one or more processors in the computer 32. In some implementations, software code (instructions), firmware, or the like, may be stored on a computer or machine-readable storage media having computer or machine-executable instructions executable by the processor (s). The processor(s) may be a programmable processor or micro-processor, such as, for example, a field-programmable gate array (FGPA) or an application-specific integrated circuit (ASIC) processor. Computer 32 might also be an image processor associated with the sensor 20. The methodology disclosed herein may be implemented and executed by an application using any one of the existing programming languages. Of course, any number of hardware implementations, programming languages, and operating/hardware platforms may be used without departing from the spirit or scope of the invention. As such, the description or recitation of any specific hardware implementation, programming language, and/or operating platform herein is exemplary only and should not be viewed as limiting.

The data cube 34 may be thought of as a multi-dimensional array of values stored in memory. It may be constructed by the computer 32 using, as input, two or more pixel images representing different polarization components of the target area 22. As shown, the data cube 34 may be formed of a pixel image 36 representing the corresponding 0-degree polarized radiances, a pixel image 38 representing the corresponding 45-degree polarized radiances, a pixel image 40 representing the corresponding 90-degree polarized radiances, and a pixel image 42 representing the corresponding 135-degree polarized radiances. The order of the polarization component images may be arbitrary for constructing the data cube 34; thus the ordering thereof does not matter.

In order to form the data cube 34, the pixel images 36-42 are "virtually" stacked upon each other as illustrated diagrammatically in FIG. 2, so that pixels at row i and column j for each image 36-42 are co-registered or aligned with each other pixel-wise for each and every pixel in the pixel images 36-42. In other words, the pixels at the row and column position (i,j) of each of the polarization filtered pixel images are aligned with each other for all values of i and j throughout the entire image. In doing so, a composite image of the target area, in the form of a data cube consisting of all four of the pixel images 36-42, is obtained, such that each pixel in this composite image represents a vector of four components, i.e., radiance values corresponding to the different polarization components. The spatial area of the data cube may be large (e.g., 320 by 256 pixels), and is directly dependent on the number of detectors featured in the sensor's focal plane array.

Although four pixel images 36-42 are illustrated in FIG. 2, in practice satisfactory results have been shown by using only two pixel images, namely pixel image 36 for polarization of 0 degrees and pixel image 40 for polarization of 90 degrees. If two pixel images are used, the difference between the polarization angles should preferably be of 90 degrees. Some examples of preferred pairs are: (0, 90), (45, 135), etc. Beyond this constraint, two or more pixel images representing different polarizations may be used, in any order for constructing the data cube 34, without deviation from the spirit or scope of the present invention.

Figure 3:
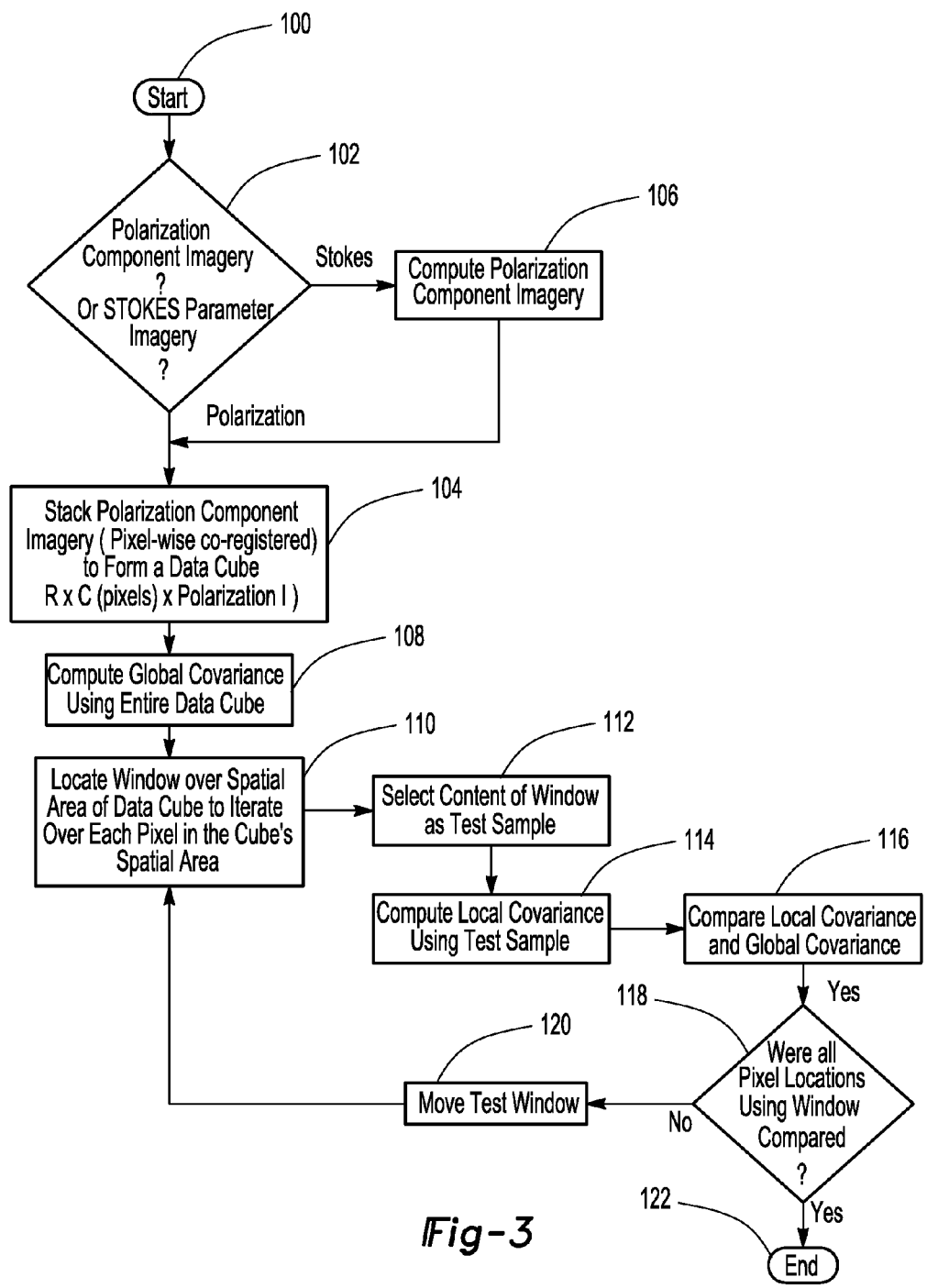
FIG. 3 is a flowchart illustrating an embodiment of the present invention.

With reference to FIG. 3, the computer 32 (FIG. 1), as programmed, determines, after initiation at step 100, whether or not the sensor 20 (FIG. 1) outputs polarization component imagery directly or the Stokes parameters $S_0$, $S_1$, and $S_2$. If the sensor 20 outputs the polarization component image directly, step 102 proceeds directly to step 104. Otherwise, step 102 branches to step 106 where the polarization component imagery is computed from the Stokes parameters as described above and step 106 then proceeds to step 104. At step 104, the data cube 34 (FIG. 2) is formed.

After the data cube 34 is formed, step 104 proceeds to step 108 where the computer 32 computes the global covariance of the entire data cube 34. The covariance provides a measure of the strength of the correlation among variates in the data cube 34. In one embodiment, the global covariance may be calculated in accordance with the following:

$$\sum = \begin{bmatrix} \sigma_0^2 & \rho\sigma_0\sigma_{90} \\ \rho\sigma_0\sigma_{90} & \sigma_{90}^2 \end{bmatrix}$$

where:
Σ=variance-covariance matrix
ρ=correlation (values between −1 and 1, inclusive)
$\sigma_\theta^2$=variance
θ=polarization angle
and where variance equals $$\sigma_\theta^2 = \frac{1}{n-1} \sum_{k=1}^n (x_\theta^{(k)} - \mu_\theta)^2,$$

where, $x_\theta^{(k)}$ denotes pixel values in the corresponding polarization component image, n is the total number of pixels observed, and the sample mean average μ equals $$\mu_\theta = \frac{1}{n} \sum_{k=1}^n x_\theta^{(k)}.$$

Since a sample from the data cube is a set of vectors, in this case each vector consists of two components at θ equals 0 degrees and θ equals 90 degrees. The covariance matrix shows the variance of each component $\sigma_\theta^2$ and the correlation level between the two components ρ. When two samples, represented here as polarization component (0 and 90 degrees) $x_0$ and $x_{90}$, are independent from each other, correlation is zero, i.e., information contained in a sample does not influence the information contained in the other sample. Highest positive correlation yields the value of +1 and highest negative correlation yields the value of −1.

After the global covariance is computed using the entire data cube 34, step 108 proceeds to step 110. At step 110, a "virtual" window is located over a spatial area of the data cube 34 to define a test sample. The test window is relatively smaller in size compared to the data cube, e.g. 10 pixels by 10 pixels. The window may begin at one corner of the cube, e.g. the upper left hand corner of the cube; although other starting locations for the window may be similarly used. Step 110 then proceeds to step 112.

At step 112, the contents of the test window are selected as the test sample. Step 112 then proceeds to step 114 where the local covariance Σ is computed for the test sample, which may be computed in the same fashion as the global covariance was computed at step 108. Step 114 then proceeds to step 116.

At step 116, the local covariance computed at step 114 is compared with the global covariance computed at step 108 to determine whether the determinant of the local covariance via the test window is greater than the determinant of the global covariance of the entire data cube 34. The determinant is a known metric that yields a single real value representing a measure of "power" of a given covariance. For instance, an image anomaly may be identified when a ratio of the local covariance and the global covariance determinants exceeds a probability-ratio threshold. If so, the spatial location of the test window in the data cube would be indicative of containing a manmade object rather than a natural object based on this ratio-of-determinants feature. More particularly, the determinant of a covariance matrix estimated from manmade object samples in this case was found to be much greater than the determinant of covariance matrices from natural object samples, or $$|\hat{\Sigma}_1^{(Manmade)}| \gg |\hat{\Sigma}_2^{(Natural)}|$$

where |*| is the determinant operator, $$|\hat{\Sigma}_1^{(Manmade)}|$$

is the determinant of the estimated covariance using only samples of manmade objects, $$|\hat{\Sigma}_2^{(Natural)}|$$

is the determinant of the estimated covariance using only samples of natural objects, and >> denotes "much greater than".

In order to determine if the covariance determinant of the local test window is much greater than the covariance determinant of the overall test cube, the following formula may be applied to test data x:

$$h(x) = -\ln p_1(x) + \ln p_2(x)$$

where $\omega_1$ is indicative that an anomaly or manmade object exists with probability $P_1$ in the test window while $\omega_2$ means an anomaly or manmade object is absent with probability $P_2$ from the window, given the probability distribution functions $p_1$ and $p_2$ of $\omega_1$ and $\omega_2$, respectively; and ln denotes the natural log.

If the Bayes decision rule is applied to the local and global covariance determinants under the assumption that the probability distribution function of the data is Gaussian then the formula above is reduced to:

$$h(x^{(L)}, x^{(G)}) = \frac{1}{2}\ln\left(\frac{|\Sigma_1^{(L)}|}{|\Sigma_2^{(G)}|}\right) \begin{array}{c} \text{Anomaly} \\ \text{Present} \\ \omega_1 \\ > \\ < \\ \omega_2 \\ \text{Anomaly} \\ \text{Absent} \end{array} \ln\left(\frac{P_1}{P_2}\right)$$

where the natural log of the ratio $P_1/P_2$ is equal to a probability threshold (preferably, by setting $P_1=P_2$, this threshold is zero), $x^{(L)}$ is the local sample using the test window, $x^{(G)}$ is the global sample using the entire test cube, $\Sigma_1^{(L)}$ is the covariance using the local sample, and $\Sigma_2^{(G)}$ is the covariance using the entire test cube. If h is greater than this threshold, an anomaly is present and vice versa.

With reference again to FIG. 3, step 116, after determining whether or not an anomaly exists in the test window, proceeds to step 118, which determines whether or not all pixel locations in the target area have been included in at least one test window. If not, step 118 proceeds to step 120, where the test window is moved a predetermined number of pixels, e.g., one pixel in the horizontal direction. Step 120 then proceeds back to step 110 where steps 110-118 are repeated until all of the pixels in the composite image from the data cube have been included in at least one test window. If so, step 118 proceeds to step 122 and the method is finished.

The test window can virtually move by one pixel in the horizontal direction until an entire row of windows across the target area have been encased in a test window. The test window then moves back to the beginning of the row, moves down one pixel, and then proceeds horizontally across the target area until all of the pixels are included in at least one test window and, more typically, multiple test windows. While it may be preferable that the test window is moved in single pixel increments in some embodiments, other increments of moving the test window may be utilized without deviation from the spirit or scope of the invention.

It is noted that other known covariance tests might be used to calculate the global and/or local covariance as alternatives to those discussed above.

In practice, the method of the present invention has been found to detect the presence of manmade or artificial objects from the natural background clutter in a target area with very low probability of error.

Once manmade objects (targets) are automatically detected using the methodology in this invention, the spatial locations of these potential targets in the composite image may be passed forward in the form of emphasized locations on a display, or as a sound alert, for a higher level decision by the user. Or they are passed forward to another machine for further processing; for instance, the targets' spatial locations may be used as the focus of attention for additional processing by some other more advanced pattern recognition method that attempts to perform target identification tasks.

An effective focus of attention methodology can significantly reduce the number of false positives in advanced automatic target recognition systems.

The comparison of the covariance of the test windows with the global covariance of the composite image of the target area has proven successful in discriminating manmade objects from natural objects without the necessity of human analysis and with very low error rates. And, since this invention does not assume knowing a priori the scales (spatial areas) of objects in the imagery, this invention is suitable for uncontrolled, outdoor environment in typical (airborne or fixed) surveillance applications from a nadir viewing perspective or from a slant viewing perspective; it works for close, short, and far ranges.

Although the performance of the present invention is range independent, there is a practical limit. The scale of any given target in the spatial area of the input image must be sufficiently large relative to the test window size, so that the radiances of the given target can have an impact on the local covariance estimation. It is believed that in the case of a target scale being smaller than some 25% of the test window area, the impact of this target on the estimation of the local covariance will likely decrease. This case could cause the local covariance to be more similar to the global covariance. Target scales greater than the test window area are fine, which reinforces the claim of range-independent performance of the present invention.

Since the entire method of the present invention is carried out by a programmed computer, the method of the present invention may be rapidly practiced without human intervention or the introduction of human error. Additionally, the method of the present invention is able to accurately differentiate manmade objects from natural objects regardless of the time of day.

Having described our invention, however, many modifications thereto will become apparent to those skilled in the art to which it pertains without deviation from the spirit of the invention as defined by the scope of the appended claims.

We claim:

1. A computer-implemented method for detecting image anomalies in a target area for classifying objects therein, the method comprising:
   a) receiving at least two images of said target area from a sensor, said at least two images representing different polarization components,
   b) creating a data cube from said at least two images by aligning pixels of the at least two-images,
   c) computing a global covariance of the data cube,
   d) computing a local covariance of a content of a test window located over a portion of the data cube, the test window being smaller in size than the data cube, and
   e) classifying at least one object in said target area, if an image anomaly is determined in the test window.

2. The method as defined in claim 1, wherein an anomaly is determined when a ratio of matrix determinants between said local covariance and said global covariance exceeds a probability-ratio threshold.

3. The method as defined in claim 1, further comprising:
   f) moving said test window by one or more pixels to form a new test window,
   g) repeating steps d) to f) until all pixels in the data cube have been included in at least one test window.

4. The method as defined in claim 1, wherein said different polarizations are spaced approximately 90 degrees apart from each other.

5. The method as defined in claim 2, wherein said classification comprises: applying a Bayes decision rule to a natural log of said ratio of said local covariance and said global covariance, and determining an anomaly when said ratio exceeds a natural log of said probability ratio threshold.

6. The method as defined in claim 3, wherein said one or more pixels in said moving step is one pixel.

7. The method as defined in claim 1, wherein a filter is used for obtaining said at least two images at different polarization angles.

8. The method as defined in claim 1, further comprising calculating pixel intensity values of the at least two images using Stokes parameters output from the sensor.

9. The method as defined in claim 8 wherein said pixel intensity values are calculated by the formula $$I_\theta = 0.5(S_0 + S_1 \cos 2\theta + S_2 \sin 2\theta)$$

where $S_0$, $S_1$ and $S_2$ are Stokes parameters and I is an intensity value at polarization angle $\theta$.

10. The method as defined in claim 1, wherein said sensor comprises a passive polarimetric longwave infrared sensor.

11. The method as defined in claim 1, further comprising: discriminating and classifying type of object from another in the target area.

12. The method as defined in claim 11, wherein the objects include manmade objects and natural objects in the target area.

13. A system for detecting image anomalies in a target area for classifying objects therein, the system comprising: at least one processor configured to execute a method according to claim 1.

14. The system as defined in claim 13, further comprising: a sensor configured to detect radiance.

15. The system as defined in claim 14, wherein the sensor is a passive sensor.

16. The system as defined in claim 14, wherein the sensor is a passive polarimetric longwave infrared sensor.

17. The system as defined in claim 14, further comprising a filter configured to filter radiance at a polarization angle.

18. The system as defined in claim 17, wherein the filter is a rotatable polarimetric filter.

19. A non-transient computer readable medium for storing computer instructions that, when executed by at least one processor, causes the at least one processor to perform a method for detecting image anomalies in a target area for identifying objects therein, according to claim 1.

* * * * *